3,234,232
Patented Feb. 8, 1966

3,234,232
1,2-DICYANO-2-SULFONYL VINYL COMPOUNDS
AND THEIR PREPARATION
Elmore L. Martin, Wilmington, Del., assignor to E. I. du
Pont de Nemours and Company, Wilmington, Del., a
corporation of Delaware
No Drawing. Filed June 6, 1962, Ser. No. 200,314
8 Claims. (Cl. 260—310)

This application is a continuation-in-part of applicant's copending application Serial No. 849,733, filed October 30, 1959, now U.S. 3,079,421.

This invention is concerned with a new class of colored organic compounds useful as dyes, and their preparation.

More particularly, the compounds of this invention are the 1,2-dicyano-2-sulfonyl vinyl compounds, i.e., those compounds having the structure

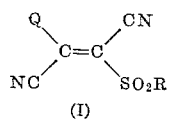
(I)

in which R is a monovalent hydrocarbyl or substituted hydrocarbyl radical and Q is a monovalent organic radical as defined below.

The compounds of the invention are prepared by the reaction of a 1,2-dicyano-1,2-disulfonylethylene with a compound QH according to the equation:

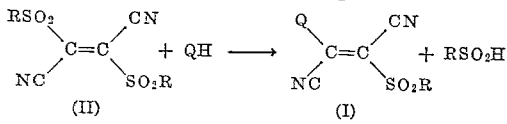

or, alternatively, by the reaction of a 1,2-dihalo-1,2-dicyanoethylene, an organosulfinate salt, and a compound QH according to the equation:

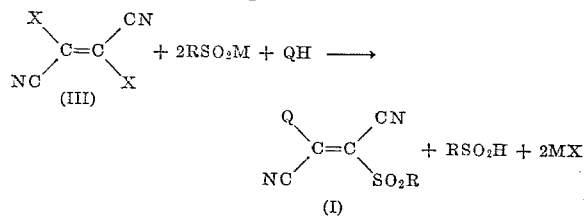

in which X is a halogen, i.e., fluorine, chlorine, bromine or iodine, and particularly chlorine or bromine, M is one equivalent of a salt-forming cation, particularly Groups I and II of the Periodic Table, and R and Q are defined as above and below.

Starting materials of the class represented by Formula II are colorless or faintly colored compounds. However, compounds of Formula I are all colored compounds which are useful as dyes. This characteristic is independent of the nature of R, the presence of any functional groups or complex structures in R serving only as auxochromes to enhance the color properties.

It will be obvious that compounds indicated by Formulas I, II, and III can exist as both cis and trans isomers. The indicated formulas are intended to embrace both such isomers since, for all of these compounds, either the cis or the trans isomer or a mixture of the two may be employed interchangeably in this invention.

A preferred group of the products of this invention are those of Formula I above in which R is hydrocarbyl or substituted hydrocarbyl in which the substituents are amino, hydrocarbyl-substituted amino, hydroxy, carbamoyl, cyano, halo (particularly fluoro, chloro, bromo, and iodo), nitro, hydrocarbylsulfonato, hydrocarbyloxy, hydrocarbyloxycarbonyl, hydrocarbylsulfonyl, carboxy, or formyl.

"Hydrocarbyl" is used in its accepted meaning as representing a radical formed from a hydrocarbon by removal of a hydrogen atom. The hydrocarbyl groups represented by R in Formula I above may be any radical composed solely of carbon and hydrogen. "Hydrocarbyl" is used in its full generic sense. The wide variation in the hydrocarbyl groups used in the illustrations which follow makes it evident that all hydrocarbyl groups are operable. Hydrocarbyl groups may vary as to whether they are alkyl, alkenyl, alkynyl, cycloalkyl, aryl, aralkyl, alkaryl, single ring, multi ring, aliphatically saturated, aliphatically unsaturated, straight chain, branched chain, large, small, and the like. The widest variation of this sort does not in any way detract from the fundamental characteristic of the hydrocarbyl radical of passing unchanged through the process of this invention and exercising no effect whatever on the chemical steps of the process. Representative hydrocarbyl groups include methyl, tert-butyl, isooctyl, dodecyl, octadecyl, eicosyl, vinyl, allyl, ethynyl, propargyl, 9,10-octadecenyl, 9,10-octadecynyl, butadienyl, 9,12-octadecadienyl, cyclopropyl, cyclobutyl, cyclohexyl, cyclooctyl, phenyl, naphthyl, anthryl, rubryl, benzyl, phenethyl, duryl, 4-isopropylnaphthyl, chrysyl, and the like.

The limitations of space for disclosure are not to be construed as any limitation within the scope of "hydrocarbyl" contemplated in this invention. Even the most cumbersome hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that hydrocarbyl groups containing 20 or fewer carbon atoms are most available, and to that extent preferred. But there is to be no question of the operability of, or of the intent to include and disclose, any hydrocarbyl group whatsoever.

In Formula I, the groups particularly preferred for R, because of their ready availability through synthetic routes, include alkyl up to and including 18 carbon atoms; lower alkenyl; lower alkynyl; cycloalkyl with three to ten carbon atoms (as in cyclopropyl, cyclohexyl, and camphyl); aralkyl with 7 to 19 carbon atoms (as in benzyl and triphenylmethyl); alkaryl of up to 7 carbon atoms (as in tolyl) and aryl with up to and including 18 carbon atoms (as in phenyl, naphthyl, anthryl, and benzanthryl), as well as substituted derivatives of these alkyl, cycloalkyl, aralkyl, alkaryl, and aryl groups carrying one or more substituents such as hydroxy, lower alkoxy, benzyloxy, aryloxy in which the aryl groups have up to 12 carbon atoms (as in phenyl, tolyl, naphthyl, and anthryl), lower alkyl, lower alkyl sulfonyl, hydroxy lower alkylsulfonyl, benzylsulfonyl, arylsulfonyl in which the aryl groups have up to 12 carbon atoms (as in phenyl, tolyl, naphthyl, and anthryl), formyl, carbamoyl, cyano, halogen (as in fluoro, chloro, bromo, and iodo), amino, dilower alkylamino, diphenylamino, dibenzylamino, acylamino in which the acyl groups contain up to seven carbon atoms (as in acetyl, butyroyl, and benzoyl), carboxy, lower alkoxycarbonyl, and nitro.

Q in the formulas above can be

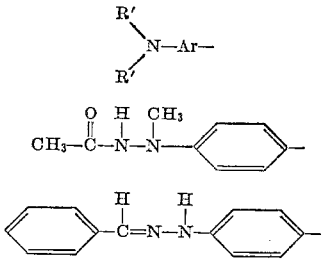

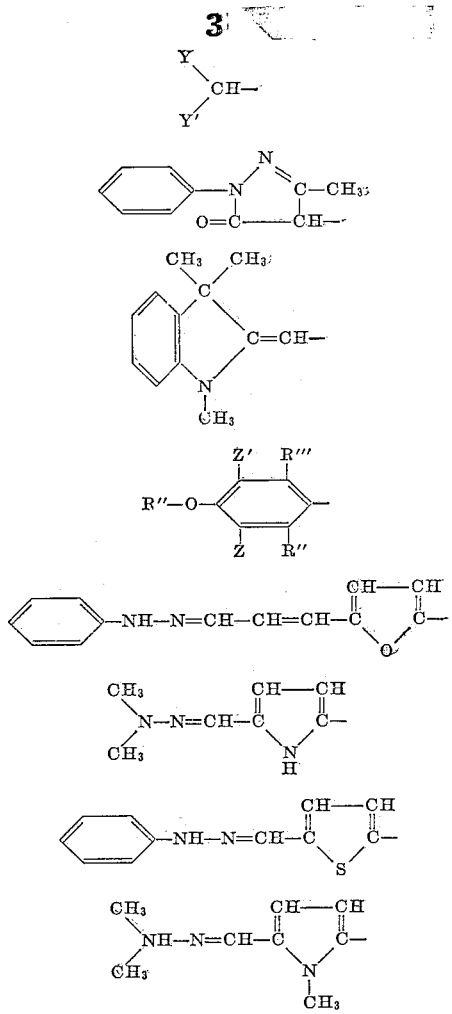

in which Ar is arylene; R' is hydrocarbyl, β-alkoxyethyl, β-benzoyloxyethyl, β-cyanoethyl, or β-trialkylammoniumethyl; R" and R'" are hydrogen or hydrocarbyl; Y and Y' are —CN, —COOR", —COR", —CONR"$_2$, —CSNR"$_2$, —SO$_2$R", and NO$_2$; Z is hydrogen, alkyl, halogen, or Y; Z' is Z, with the proviso that Z' and R'" taken together may form another aryl ring; and n is 0 or 1. It is to be understood that in a given compound the several embodiments of R' and R" that may be involved may be the same or different, respectively.

By arylene is meant any divalent carbocyclic arylene, i.e., phenylene, naphthylene, and anthrylene.

The preferred groups comprising R' are cycloalkyl, alkenyl, and alkynyl, and alkyl which can be substituted with hydrogen, alkoxy, acyloxy, cyano, or trialkylammonium.

Preferred species of R" include hydrogen, alkyl and aryl; while the preferred R'" groups are hydrogen and alkyl.

The preparation of 1,2-dicyano-2-sulfonyl vinyl compounds according to this invention may be carried out over a wide range of temperatures. Temperatures ranging from about —100° C. up to the decomposition temperature of the reactants and/or products are operable. Temperatures in the range from —40° C. to 150° C. are generally suitable and temperatures in the range of 0 to 50° C. are particularly preferred.

Pressure is not a critical factor in the process of this invention. Pressure both below and above atmospheric pressure may be employed. Atmospheric pressure is preferred for convenience.

The use of a reaction medium is optional since the formation of the 1,2-dicyano-2-sulfonyl vinyl dyes of this invention can be readily accomplished in the solid state by impact grinding together the reactants indicated above. The use of a liquid reaction medium which is chemically inert to the reactants and products permits control of the temperature of the reaction and, therefore, is preferred. Media which are solvents for the 1,2-dicyano-1,2-disulfonyl reactants are particularly preferred, i.e., such liquids as dimethylformamide, tetrahydrofuran, acetone, methanol, ethanol, methylene chloride, and the like.

In the organosulfinate salts represented by the formula RSO$_2$M in the equation above, M may be any salt-forming cation of any valence, such as a metal cation, an ammonium cation, a sulfonium cation, and the like. All metals are operable. The metals of Groups I and II of the Periodic Table represent a preferred group.

It is sometimes convenient to carry out the process of this invention under anhydrous conditions. However, this is by no means essential since the 1,2-dicyano-1,2-disulfonylethylenes in the presense of both water and a compound QH react preferentially with the compound QH, and the reaction can be carried out in the presence of water.

While compounds of Formulas II and III above react with compounds QH on an equimolar basis to form compounds of Formula I, this in no way limits the proportions of the reactants which may be brought together to carry out the process of the invention. Molar proportions in the range of 19:1 to 1:19 may be employed, and molar proportions in the range from 2:1 to 1:2 are preferred.

As indicated in the examples which follow, the 1,2-dicyano-1,2-disulfonylethylenes used as starting materials in the process of this invention are readily prepared by the reaction of a perhalogenated 1,2-dicyanoethylene or -ethane with a salt of an organic sulfinic acid.

In the following examples parts are by weight unless otherwise indicated. Example II represents a preferred embodiment.

EXAMPLE I 2-(4-dimethylaminophenyl)-1-(4-tolylsulfonyl) ethene-1,2-dicarbonitrile

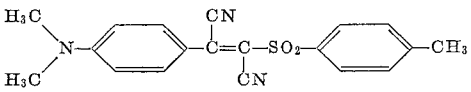

To a solution of 147 parts of dichlorofumaronitrile in 1890 parts of dimethylformamide is added 178 parts of finely powdered anhydrous sodium p-toluenesulfinate, and the reaction mixture is warmed briefly on a steam bath. N,N-dimethylaniline (121 parts) is added whereupon a deep magenta solution is obtained. The reaction mixture is diluted with a large volume of cold water, the precipitate is collected, and is washed with cold water. The filter cake is dissolved in methylene chloride, the solution is dried with anhydrous magnesium sulfate and is concentrated to a small volume. The addition of ether precipitates bright red needles of 2-(4-dimethylaminophenyl)-1-(4-tolylsulfonyl)ethene-1,2-dicarbonitrile.

EXAMPLE II 2-(4-dimethylaminophenyl)-1-(4-tolylsulfonyl) ethene-1,2-dicarbonitrile

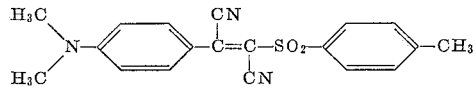

To a solution of 294 parts of dichlorofumaronitrile in 1890 parts of dimethylformamide is added in small portions 356 parts of finely powdered anhydrous sodium p-toluenesulfinate. The temperature is maintained at 20–25° C. by means of external cooling during the addition of the sulfinate. As soon as the addition of the sulfinate is complete, 500 parts of N,N-dimethylaniline is added in one portion. The exothermic reaction causes the temperature to reach 38° C. and after stirring at this temperature for 10 minutes, the reaction is diluted with a large volume of cold water. The crystalline dye which separates is collected by filtration, is washed with water, and is crystallized from methylene chloride-ether mixture. The yield of bright red needles of 2-(4-dimethylaminophenyl)-1-(4-tolylsulfonyl)ethene - 1,2 - dicarbonitrile melting at 193–195° C. is 290 parts. The molecular extinction coefficient in methylene chloride at 517 mμ is 38,600.

Analysis.—Calcd. for $C_{19}H_{17}O_2N_3S$: C, 64.92; H, 4.88; N, 11.97. Found: C, 65.17; H, 5.00; N, 11.99.

EXAMPLE III 2-(4-dimethylaminophenyl)-1-methylsulfonylethene-1,2-dicarbonitrile

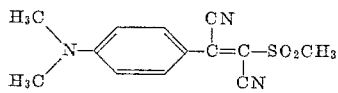

To a solution of 44 parts of dichlorofumaronitrile and 72 parts of N,N-dimethylaniline in 140 parts of dimethylformamide is added 40 parts of finely powdered, anhydrous sodium methanesulfinate in small portions with stirring at 25–30° C. After stirring for 15 minutes at 30° C., the reaction mixture is diluted with cold water. The crystalline precipitate is collected, is washed first with cold water and then with petroleum ether (B.P. 30–60° C.). The moist filter cake is dissolved in methylene chloride, the solution is dried with anhydrous magnesium sulfate and is concentrated to a small volume. Bright red, felt-like needles precipitate on the addition of anhydrous ether. The bright red crystals change to greenish, microscopic crystals on refluxing with ether for several minutes. The yield of 2-(4-dimethylaminophenyl)-1-methylsulfonylethene-1,2-dicarbonitrile melting at 189–91° C. is 49 parts. The dye has a molecular extinction coefficient of 39,000 at 514 mμ in methylene chloride. Analysis indicates that the product contains ether of crystallization.

Analysis.—Calcd. for $C_{13}H_{13}O_2N_2S \cdot \frac{1}{4}C_4H_{10}O$: C, 57.24; H, 5.23; N, 14.32. Found: C, 57.40; H, 5.02; N, 14.34.

EXAMPLE IV 2-(4-dimethylaminophenyl)-1-n-butylsulfonylethene-1,2-dicarbonitrile

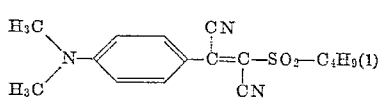

To a solution of 4.4 parts of dichlorofumaronitrile and 72 parts of N,N-dimethylaniline in 170 parts of dimethylformamide is added 50 parts of anhydrous sodium 1-butanesulfinate in small portions with stirring at 25–30° C. The reaction mixture is stirred at 30–35° C. for five minutes, then at 40° C. for five minutes, and is diluted with a large volume of ice water. The dye is collected by filtration. The filter cake is washed with water and is taken up in methylene chloride. The methylene chloride solution is dried with anhydrous magnesium sulfate and is concentrated to a small volume. Deep red crystals separate on addition of anhydrous ether. A second crystallization from methylene chloride-ether gives 51 parts of deep red crystals of 2-(4-dimethylaminophenyl)-1 - n - butylsulfonylethene-1,2 - dicarbonitrile melting at 151–153° C. The molecular extinction coefficient in methylene chloride is 33,600 at 513 mμ.

Analysis.—Calcd. for $C_{16}H_{19}O_2N_3S$: C, 60.52; H, 6.04; N, 13.25; S, 10.10. Found: C, 60.43; H, 5.94; N, 13.54; S, 10.25.

EXAMPLE V 2-(4-dimethylaminophenyl)-1-benzylsulfonylethene-1,2-dicarbonitrile

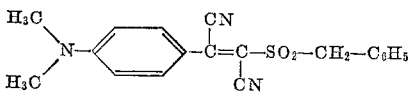

To a solution of 44 parts of dichlorofumaronitrile and 72 parts of N,N-dimethylaniline in 230 parts of dimethylformamide is added in small portions 53 parts of anhydrous sodium benzylsulfinate with stirring, the temperature being maintained at 25–30° C. by means of external cooling. The reaction mixture is stirred at 30–40° C. for an additional period of 10 minutes, is diluted with a large volume of cold water, and the gummy solid which separates is collected and washed with cold water. For purification, the compound is crystallized twice from methylene chloride-ether mixture and twice from methylene chloride-methanol mixture. The yield of deep green crystals of 2-(4-dimethylaminophenyl)-1-benzylsulfonylethene-1,2-dicarbonitrile melting at 186–188° C. is 25 parts. The molecular extinction coefficient in methylene chloride is 38,000 at 518 mμ.

Analysis.—Calcd. for $C_{19}H_{17}O_2N_3S$: C, 64.92; H, 4.88; N, 11.97; S, 9.13. Found: C, 64.49; H, 5.37; N, 12.06; S, 9.17.

EXAMPLE VI 2-(4-dimethylaminophenyl)-1-(4-tolylsulfonyl)ethene-1,2-dicarbonitrile

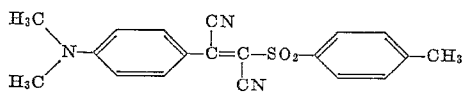

To a solution of 42 parts of tetrachlorosuccinonitrile and five parts of N,N-dimethylaniline in 188 parts of dimethylformamide is added 108 parts of finely powdered, anhydrous sodium p-toluenesulfinate in small portions with stirring at 10–13° C. After stirring for 10 mintues at 25° C., the reaction mixture is diluted with cold water. The crystalline precipitate is collected, is washed first with cold water and then with petroleum ether (B.P. 30–60° C.). Crystallization of the compound from methylene chloride-ether gives bright red needles of 2-(4-dimethylaminophenyl)-1-(4-tolylsulfonyl)ethene-1,2-dicarbonitrile, M.P. 193–195° C., alone or in admixture with a sample of the product from Example II.

EXAMPLE VII 2-(4-dimethylaminophenyl)-1-phenylsulfonylethene-1,2-dicarbonitrile

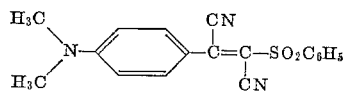

To a solution of 45 parts of dichlorofumaronitrile in 230 parts of dimethylformamide and 75 parts of N,N-dimethylaniline is added in small portions 62 parts of anhydrous sodium benzenesulfinate with stirring. The temperature is maintained at 10–15° C. by means of external cooling during the addition of the sulfinate and for an additional period of 15 minutes. The reaction mixture is diluted with water and the precipitate is collected by filtration. The filter cake is washed with water and a small volume of ether. Two crystallizations from methylene chloride-ether give 72 parts of stout, deep red needles of 2-(4-dimethylaminophenyl)-1-phenylsulfonylethene-1,2-dicarbonitrile melting at 180–181° C. The compound has a molecular extinction coefficient of 37,800 at 518 mμ.

Analysis.—Calcd. for $C_{18}H_{15}O_2N_3S$: C, 64.06; H, 4.88; N, 12.46; S, 9.51. Found: C, 64.28; H, 4.70; N, 12.67; S. 9.49.

EXAMPLE VIII

*2-(4-methylaminophenyl)-1-(4-tolylsulfonyl)ethene-1,2-dicarbonitrile*

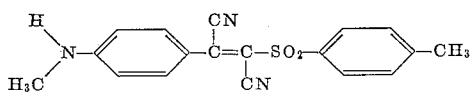

A solution of 59 parts of dichlorofumaronitrile in 135 parts of dimethylformamide is cooled to −20° C. and 72 parts of finely powdered anhydrous sodium p-toluenesulfinate and 86 parts of N-methylaniline are added simultaneously and at approximately equivalent rates with stirring. The temperature is maintained at −10 to −20° C. during the addition and then allowed to increase to 25° C. After stirring for 30 minutes at 25° C., the reaction mixture is diluted with a large volume of cold water. Two crystallizations from methyene chloride-ether give 100 parts of bright red crystals of 2-(4-methylaminophenyl)-1-(4-tolylsulfonyl)ethene-1,2 - dicarbonitrile melting at 156–157° C. The molecular extinction coefficient in methylene chloride is 11,000 at 490 m$\mu$.

*Analysis.*—Calcd. for $C_{18}H_{15}O_2N_3S$: C, 64.06; H, 4.48; S, 9.51. Found: C, 64.08; H, 4.63; S, 9.31.

EXAMPLE IX

Part A

To a solution of 294 parts of dichlorofumaronitrile in 2300 parts of dimethylformamide is added in small portions 356 parts of finely powdered, anhydrous sodium p-toluenesulfinate. The temperature is maintained at 10–20 °C. by means of external cooling during the addition of the sulfinate, the for an additional period of five minutes. The reaction mixture is diluted with a large volume of cold water and the reaction mixture is filtered. The filter cake is washed with water and a small volume of methanol. Crystallization from methylene chloride gives 180 parts of 1,2-dicyano-1,2-bis(p-toluenesulfonyl)ethylene in the form of faintly yellow needles melting at 245–247° C. with decomposition.

Part B.—*2-(4-methylaminophenyl)-1-(4-tolylsulfonyl)-ethene-1,2-dicarbonitrile*

To a suspension of 39 parts of 1,2-dicyano-1,2-bis(p-toluenesulfonyl)ethylene in 190 parts of dimethylformamide is added 30 parts of N-methylaniline and the resulting reaction mixture is warmed to 60° C. The reaction mixture is diluted with cold water and the gummy precipitate which forms is crystallized twice from methylene chloride-ether to give bright red crystals of 2-(4-methylaminophenyl)-1-(4-tolylsulfonyl)ethene-1,2 - dicarbonitrile melting at 156–157° C. either alone or in admixture with a sample of the product prepared as described in Example VIII.

EXAMPLE X

*2-(4-[N-β-cyanoethyl-N-methylamino]phenyl)-1-(4-tolylsulfonyl)ethene-1,2-dicarbonitrile*

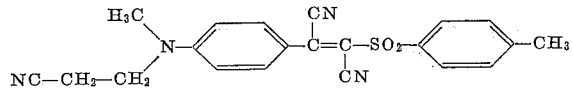

To a solution of 147 parts of dichlorofumaronitrile and 320 parts of N-methyl-N-(2-cyanoethyl)aniline in 1400 parts of dimethylformamide is added in small portions 180 parts of finely powdered, anhydrous sodium p-toluenesulfinate. The temperature is maintained at 25–30° C. during the addition of the sulfinate and at 40° C. for an additional period of 10 minutes after the addition is complete. The reaction mixture is diluted with a large volume of cold water and the gummy precipitate which forms is collected. Three crystallizations from methyene chloride-methanol give 100 parts of bright orange crystals of 2-(4-[N-β-cyanoethyl-N-methylamino]phenyl)-1-(4 - tolylsulfonyl)ethene-1,2-dicarbonitrile melting at 173–175° C. with decomposition. The molecular extinction coefficient in methylene chloride is 35,000 at 492 m$\mu$.

*Analysis.*—Calcd. for $C_{21}H_{18}O_2N_4S$: C,64.57; H, 4.65; N, 14.36; S, 8.22. Found: C, 64.64; H, 4.73; N, 14.64; S, 8.31.

EXAMPLE XI

Part A

In the procedure of Part A of Example IX, sodium ethylsulfinate is substituted for sodium p-toluenesulfinate to obtain 1,2-dicyano-1,2-bis(ethylsulfonyl)ethylene.

Part B.—*2-(4-dimethylaminophenyl)-1-ethylsulfonyl-ethene-1,2-dicarbonitrile*

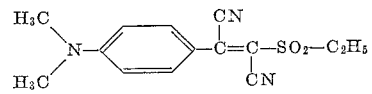

To a solution of 20 parts of 1,2-dicyano-1,2-bis(ethylsulfonyl)ethylene in 475 parts of dimethylformamide is added 50 parts of N,N-dimethylaniline. After the exothermic reaction has subsided, the reaction mixture is diluted with ice and water and the precipitated dye is collected. Crystallization from ethylene chloride-ether gives 15 parts of 2-(4-dimethylaminophenyl)-1-ethylsulfonylethene-1,2-dicarbonitrile melting at 185–186° C. The molecular extinction coefficient in methylene chloride is 36,500 at 513 m$\mu$.

*Analysis.*—Calcd. for $C_{14}H_{15}O_2N_3S$: C, 58.09; H, 523; S, 11.09. Found: C, 58.37; H, 5.40; S, 11.12.

EXAMPLE XII

*2-(4-dimethylaminophenyl)-1-(4-chlorophenylsulfonyl)-ethene-1,2-dicarbonitrile*

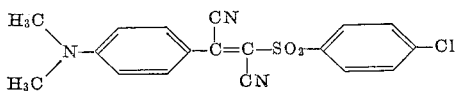

To a solution of 30 parts of dichlorofumaronitrile and 50 parts of N,N-dimethylaniline in 94 parts of dimethylformamide is added 40 parts of anhydrous finely powdered sodium p-chlorobenzenesulfinate in small portions with stirring, the temperature being maintained at 40–50° C. by external cooling. After stirring for an additional period of five minutes at 40–50° C., the reaction mixture is diluted with ice and water and the crystalline precipitate which forms is collected by filtration and is washed with cold water. The moist filter cake is dissolved in methylene chloride and the resulting solution is washed in turn with cold, dilute hydrochloric acid, cold dilute sodium bicarbonate solution and with cold water. After drying with anhydrous magnesium sulfate, the methylene chloride solution of the dye is concentrated to a small volume. Anhydrous ether is added and the concentration is continued, whereupon crystals of the dye separate. The crystals are collected and washed with ether and crystallized a second time from methylene chloride-ether as described above. The yield of 2-(4-dimethylaminophenyl) - 1 - (4 - chlorophenylsulfonyl) ethene-1,2-dicarbonitrile melting at 185–186° C. (with decomposition) is 34 parts. The dye has a molecular extinction coefficient in methylene chloride at 524 m$\mu$ of 40,500.

*Analysis.*—Calcd. for $C_{18}H_{14}O_2N_3SCl$: C, 58:11; H, 3.80; N, 11.31. Found: C, 57.97; H, 3.98; N, 11.38.

EXAMPLE XIII

*2-(4-dimethylaminophenyl)-1-allylsulfonylethene-1,2-dicarbonitrile*

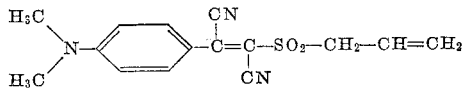

To a solution of 21 parts of dichlorofumaronitrile and 10 parts of N,N-dimethylaniline in 47 parts of dimethylformamide is added in small portions with stirring a suspension of 20 parts of sodium allylsulfinate in 95 parts of dimethylformamide and 40 parts of N,N-dimethylaniline, the temperature being maintained at 30-40° C. by means of external cooling. After stirring for five minutes at 40–45° C., the reaction mixture is diluted with ice and water and the precipitated dye is collected by filtration and washed with cold water. The filter cake is dissolved in methylene chloride and washed in turn with cold water, dilute hydrochloric acid, dilute sodium bicarbonate solution and water. After drying with anhydrous magnesium sulfate, the mixture is concentrated to a small volume and anhydrous ether is added, whereupon purplish-black crystals of the dye separate. The yield of 2-(4-dimethylaminophenyl)-1-allylsulfonylethene-1,2-dicarbonitrile melting at 172–173° C. (with decomposition) is 9 parts. The dye has a molecular extinction coefficient in methylene chloride at 515 mμ of 36,700.

*Analysis.*—Calcd. for $C_{15}H_{15}O_2N_3S$: C, 59.76; H, 5.02; N, 13.96. Found: C, 59.69; H, 4.81; N, 13.84.

EXAMPLE XIV

Part A

To 95 parts of dimethylformamide cooled to −40° C. is added 100 parts of magnesium cyclohexylsulfinate followed by the addition in small portions with stirring of a solution of 45 parts of dichlorofumaronitrile in 45 parts of tetrahydrofuran, the temperature being maintained at −40 to −30° C. by means of external cooling. One hundred (100) parts of anhydrous magnesium sulfate is added and the reaction mixture is allowed to warm to 20° C. whereupon an exothermic reaction takes place and the temperature is maintained at 25–35° C. by cooling. After stirring for three minutes at 25–35° C., reaction mixture is diluted with ice and water and the precipitate is collected by filtration and is washed with cold water. The moist filter cake is dissolved in methylene chloride and the solution is washed in turn with dilute hydrochloric acid, dilute sodium bicarbonate solution, and water. After drying with anhydrous magnesium sulfate, the solution is concentrated to a small volume during which time colorless crystals separate. Anhydrous ether is added and the concentration is continued to a small volume. The yield of colorless crystals melting at 215–216° C. with decomposition is 32 parts. Recrystallization from methylene chloride-ether as above gives colorless crystals of 1,2-bis(cyclohexylsulfonyl)-1,2-dicyanoethylene melting at 216–217° C. with decomposition.

*Part B.—2-(4-dimethylaminophenyl)-1-cyclohexylsulfonylethene-1,2-dicarbonitrile*

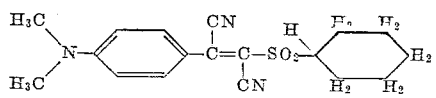

To a solution of 1,2-bis(cyclohexylsulfonyl)-1,2-dicyanoethylene in dimethylformamide is added N,N-dimethylaniline. The solution turns deep magenta in color with the formation of 2-(4-dimethylaminophenyl)-1-cyclohexylsulfonylethene-1,2-dicarbonitrile.

EXAMPLE XV

Part A

A solution of 45 parts of sodium 4-acetamidobenzenesulfinate in 141 parts of dimethylformamide is cooled to −20° C. and 15 parts of dichlorofumaronitrile is added slowly with stirring, the temperature being maintained at −10 to −20° C. The reaction mixture gradually thickens to a stiff mass and after stirring for an additional five minutes at −10° C. the reaction mixture is diluted with ice and water and the crystalline 1,2-dicyano-1,2-bis(4-acetamidophenylsulfonyl)ethylene is collected by filtration, is washed with water, then with methanol, and finally with ether. The yield of bright yellow crystalline material melting above 280° C. with decomposition and insoluble in most organic solvents is 29 parts.

*Part B.—2-(4-dimethylaminophenyl)-1-(4-acetamidophenylsulfonyl)ethene-1,2-dicarbonitrile*

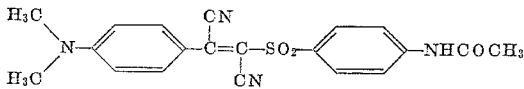

To a suspension of 12 parts of 1,2-dicyano-1,2-bis(4-acetamidophenylsulfonyl)ethylene in 95 parts of dimethylformamide is added six parts of N,N-dimethylaniline and the reaction mixture is stirred at 25° C. for 10 minutes. After dilution with ice and water, the crystalline dye which forms is collected, washed with water, and dissolved in methylene chloride. The methylene chloride solution is washed in turn with dilute hydrochloric acid, dilute sodium bicarbonate, and water. After drying with anhydrous magnesium sulfate, the filtrate is concentrated to a small volume, anhydrous ether is added and the concentration is continued during which time, red felt-like crystals separate. The yield of 2-(4-dimethylaminophenyl)-1-(4-acetamidophenylsulfonyl)ethene - 1,2-dicarbonitrile melting at 204–206° C. is three parts. The molecular extinction coefficient in methylene chloride at 520 mμ is 38,600.

*Analysis.*—Calcd. for $C_{20}H_{18}O_3N_4S$: C, 60.88; H, 4.60; N, 14.22. Found: C, 60.98; H, 4.54; N, 14.20, 14.21.

EXAMPLE XVI

*2-(4-dimethylaminophenyl)-1-(2-cyanophenylsulfonyl)ethene-1,2-dicarbonitrile*

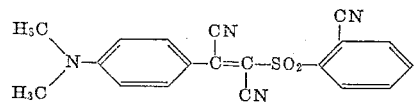

To 95 parts of dimethylformamide cooled to −60° C. is added 45 parts of finely powdered sodium 2-cyanobenzenesulfinate and to the resulting reaction mixture is added slowly with stirring a solution of 15 parts of dichlorofumaronitrile in 25 parts of tetrahydrofuran. The reaction mixture is stirred at −50 to −60° C. for five minutes and then warmed to −10° C. and 24 parts of N,N-dimethylaniline is added in one portion. The resulting deep magenta solution is warmed to 25° C. and stirred at this temperature for 10 minutes. The reaction mixture is diluted with ice and water and the crystalline dye is collected by filtration and washed with cold water and petroleum ether. The dye is dissolved in methylene chloride and the solution is washed in turn with dilute hydrochloric acid, dilute sodium bicarbonate, and water. The methylene chloride solution of the dye is dried with anhydrous magnesium sulfate and the filtrate is concentrated to a small volume and anhydrous ether is added. Deep blue crystals separate on concentration to a small volume. A second crystallization gives 13 parts of 2-(4-dimethylaminophenyl) - 1 - (2 - cyanophenylsulfonyl)ethene-1,2-dicarbonitrile as deep blue crystals melting at 222–24° C. The molecular extinction coefficient in methylene chloride at 532 mμ is 42,000.

*Analysis.*—Calcd. for $C_{19}H_{14}O_2N_4S$: C, 62.94; H, 3.89; N, 15.47. Found: C, 62.45; H, 4.01; N, 14.42; 15.74.

EXAMPLE XVII

*2-(4-dimethylaminophenyl)-1-(4-nitrophenylsulfonyl)ethene-1,2-dicarbonitrile*

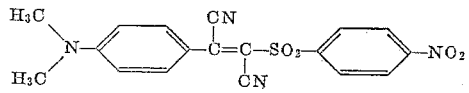

A solution of 42 parts of sodium p-nitrobenzenesulfinate in 140 parts of dimethylformamide is cooled to −60° C.

and a solution of 15 parts of dichlorofumaronitrile in 25 parts of tetrahydrofuran is added slowly with stirring, the temperature being maintained at −50 to −60° C. The reaction mixture is stirred for an additional period of five minutes at −50 to −60° C., then warmed to −30° C., and 24 parts of N,N-dimethylaniline is added in one portion. The resulting deep purple solution is warmed to 30° C. and stirred at this temperature for five minutes. The reaction mixture is diluted with ice and water and the crystals of the dye are collected and washed with water and petroleum ether. The dye is dissolved in methylene chloride, the solution is washed in turn with dilute hydrochloric acid, dilute sodium bicarbonate, and water. The methylene chloride solution is dried with anhydrous magnesium sulfate and the filtrate is concentrated to a small volume. Anhydrous ether is added and the solution is concentrated to a small volume, during which time 24 parts of 2-(4-dimethylaminophenyl) - 1 - (4-nitrophenylsulfonyl)ethene-1,2-dicarbonitrile separate as deep green crystals melting at 209–210° C. The molecular extinction coefficient in methylene chloride at 537 m$\mu$ is 45,000.

Analysis. — Calcd. for $C_{18}H_{14}O_4N_4S \cdot \frac{1}{2}CH_2Cl_2$: C, 52.27; H, 3.56; N, 13.20. Found: C, 52.29; H, 3.58; N, 12.53.

EXAMPLE XVIII 2-(4-dimethylaminophenyl)-1-(4-methoxyphenylsulfonyl)ethene-1,2-dicarbonitrile

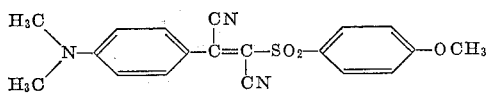

To a solution of 30 parts of dichlorofumaronitrile and 48 parts of N,N-dimethylaniline in 144 parts of dimethylformamide is added in small portions 40 parts of finely powdered, anhydrous sodium p-methoxybenzenesulfinate. The reaction mixture is stirred at 25–30° C. for 10 minutes and is diluted with a large volume of cold water. The crystalline dye is collected by filtration, is washed with water and is crystallized from methylene chloride-ether. The yield of 2-(4-dimethylaminophenyl) - 1 - (4-methoxyphenylsulfonyl)ethene - 1,2 - dicarbonitrile in the form of deep violet crystals, M.P. 173–175° C., is 36 parts. The molecular extinction coefficient in methylene chloride at 516 m$\mu$ is 37,900.

Analysis.—Calcd. for $C_{19}H_{17}O_3N_3S$: C, 62.08; H, 4.67; N, 11.44. Found: C, 62.02; H, 4.82; N, 11.47.

EXAMPLE XIX 1,2-bis[(1,2-dicyano-2-(p-dimethylaminophenyl)vinyl)sulfonyl]ethane

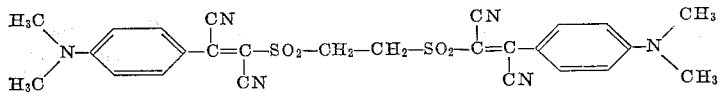

To a solution of 30 parts of dichlorofumaronitrile and 50 parts of N,N-dimethylaniline in 95 parts of dimethylformamide is added in small portions 20 parts of finely powdered, anhydrous disodium ethane - 1,2 - disulfinate. The reaction mixture is stirred at 30–40° C. for five minutes and is diluted with a large volume of cold water. The crystalline dye is collected by filtration, is washed with water, and is crystallized from methylene chloride-ether. The yield of 1,2-bis[(1,2-dicyano-2-(p-dimethylaminophenyl)vinyl)sulfonyl]ethane melting at 240–242° C. with decomposition is five parts. The molecular extinction coefficient in methylene chloride is 33,800 at 518 m$\mu$.

Analysis.—Calcd. for $C_{26}H_{24}O_4N_6S_2$: C, 56.89; H, 4.41; S, 11.70. Found: C, 56.94; H, 4.43; S, 11.52.

EXAMPLE XX 2-(4-dimethylaminophenyl)-1-(4-tolylsulfonatomethylsulfonyl)ethene-1,2-dicarbonitrile

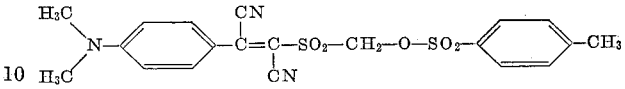

To a solution of 30 parts of dichlorofumaronitrile and 50 parts of N,N-dimethylaniline in 188 parts of dimethylformamide is added in small portions 58 parts of sodium p-toluenesulfonatomethylsulfinate dihydrate. The reaction mixture is stirred at 25–30° C. for 15 minutes and is diluted with a large volume of cold water. The aqueous solution is decanted from the gummy precipitate and the residue is stirred with petroleum ether (B.P. 30–60° C.). Three crystallizations from methylene chloride-ether give 22 parts of 2-(4-dimethylaminophenyl) - 1 - (4-tolylsulfonatomethylsulfonyl)ethene - 1,2 - dicarbonitrile melting at 170–172° C. with decomposition. The molecular extinction coefficient in methylene chloride is 41,700 at 532 m$\mu$.

Analysis. — Calcd. for $C_{20}H_{19}O_5N_3S_2 \cdot \frac{1}{2}CH_2Cl_2$: C, 50.43; H, 4.13; S, 13.15. Found: C, 50.80; H, 4.62; S, 13.15.

EXAMPLE XXI 2-(4-dimethylaminophenyl)-1-iodomethylsulfonylethene-1,2-dicarbonitrile

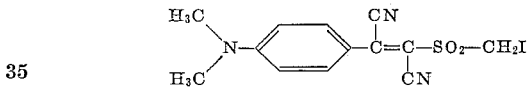

In the procedure of Example XX zinc iodomethylsulfinate [$Zn(O_2SCH_2I)_2$] is substituted for sodium p-toluenesulfonatomethylsulfinate to obtain 2-(4-dimethylaminophenyl)-1-iodomethylsulfonylethene - 1,2 - dicarbonitrile in the form of a magenta dye having an absorption maximum at 523 m$\mu$ in methylene chloride.

EXAMPLE XXII 2-(4-dimethylaminophenyl)1-(4-isopropylphenylsulfonyl)ethene-1,2-dicarbonitrile

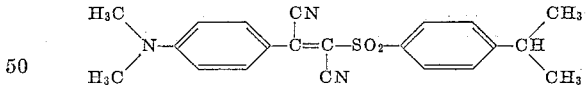

To a solution of 30 parts of dichlorofumaronitrile and 25 parts of N,N-dimethylaniline in 94 parts of dimethylformamide is added in small portions 44 parts of finely powdered, anhydrous potassium p-isopropylbenzenesulfinate at 25–30° C. After stirring for 15 minutes, the reaction mixture is diluted with a large volume of cold water. The gummy precipitate is collected by filtration and is washed with water. Three crystallizations from methylene chloride-ether give 60 parts of 2-(4-dimethylaminophenyl)-1(4-isopropylphenylsulfonyl)ethenes - 1,2-dicarbonitrile in the form of deep green crystals melting at 153–155° C. The molecular extinction coefficient in methylene chloride is 38,200 at 517 m$\mu$.

Analysis.—Calcd. for $C_{21}H_{21}O_2N_3S$: C, 66.49; H, 5.58; S, 8.45. Found: C, 66.56; H, 5.70; S, 8.34.

EXAMPLE XXIII

*2-(1,3,3-trimethylindolin-2-ylidenemethyl)-1-(4-tolyl-sulfonyl)ethene-1,2-dicarbonitrile*

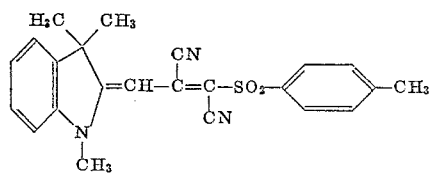

To a solution of 35 parts of 1,3,3-trimethyl-2-methyleneindoline in 188 parts of dimethylformamide is added in small portions 79 parts of 1,2-dicyano-1,2-bis(p-tolylsulfonyl)ethylene with stirring at 25–35° C. After stirring for an additional period of 10 minutes at 25–30° C., the reaction mixture is diluted with ice water. The crystalline material is collected by filtration and is washed with cold water. Four crystallizations from methylene chloride-ether give deep red crystals of 2-(1,3,3-trimethyl-indolin-2-ylidenemethyl)-1-(4-tolylsulfonyl)ethene - 1,2-dicarbonitrile melting at 223–224° C. The molecular extinction coefficient in methylene chloride at 502 mµ is 48,500.

*Analysis.*—Calcd. for $C_{23}H_{21}O_2N_3S$: C, 68.46; H, 5.25; S, 7.95. Found: C, 68.50; H, 5.62; S, 7.99.

EXAMPLE XXIV

*2-(3-methyl-1-phenyl-2-pyrazolin-5-one-4-yl)-1-(4-tolyl-sulfonyl)ethene-1,2-dicarbonitrile*

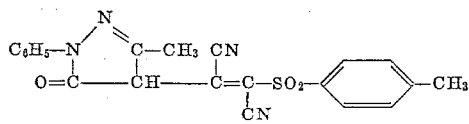

To a solution of 17 parts of 3-methyl-1-phenyl-2-pyrazolin-5-one in 234 parts of dimethylformamide is added in small portions at −10° C. with stirring 38 parts of 1,2-dicyano-1,2-bis(p-tolylsulfonyl)ethylene. The resulting reaction mixture is stirred at 0° C. for 30 minutes and is diluted with a large volume of cold water. The deep yellow precipitate which forms is collected by filtration and is washed with cold water. The moist filter cake is dissolved in warm acetone. The solution is filtered and the dye is precipitated by the addition of water. This purification process is repeated a second time to give 27 parts of 2-(3-methyl-1-phenyl-2-pyrazolin-5-one-4-yl)-1-(4-tolylsulfonyl)ethene-1,2-dicarbonitrile in the form of deep yellow crystals melting at 171–173° C. with decomposition. The molecular extinction coefficient in methylene chloride at 405 mµ is 8,700.

*Analysis.*—Calcd. for $C_{21}H_{16}O_3N_4S \cdot \frac{1}{2} 2H_2O$: C, 61.0; H, 4.15; S, 7.76. Found: C, 61.18; H, 4.15; S, 7.80.

EXAMPLE XXV

*2-[3-N-(m-2-dioxolanylphenyl)carbamyl - 4 - hydroxy-1-naphthyl]-1-(4-tolylsulfonyl)ethene-1,2-dicarbonitrile*

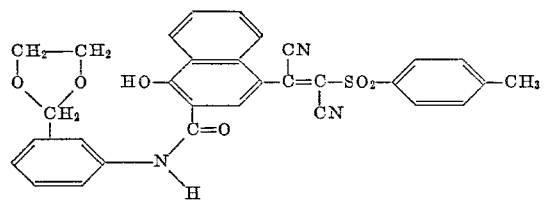

To a solution of 33 parts of m-(1-hydroxy-2-naphthamido)benzaldehyde ethylene glycol acetal and 15 parts of dichlorofumaronitrile in 188 parts of dimethylformamide is added in small portions at 0–5° C. 18 parts of finely powdered, anhydrous sodium p-toluenesulfinate. The mixture is stirred at 0–5° C. for 20 minutes and is diluted with ice water. The aqueous solution is decanted from the gummy precipitate and the precipitate is washed first with cold water and then stirred with a small volume of methanol whereupon 2-[3-N-(m-2-dioxolanylphenyl)carbamyl - 4 - hydroxy - 1 - naphthyl]-1-(4-tolylsulfonyl)ethene-1,2-dicarbonitrile in the form of a red crystalline material is obtained. The crystalline product is collected by filtration and is washed with a small volume of cold methanol. The absorption maximum in acetone is 440 mµ and in acetone-aqueous sodium acetate is 560 mµ.

EXAMPLE XXVI

*2-(2-hydroxy-e-naphthyl)-1-(4-tolysulfonyl)ethene 1,2-dicarbonitrile*

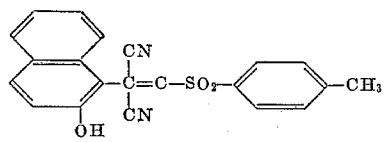

To a solution of 15 parts of β-naphthol in 49 parts of dimethylformamide is added 39 parts of 1,2-dicyano-1,2-bis(p-tolylsulfonyl)ethylene, and the reaction mixture is stirred at 70–80° C. until a homogeneous deep orange solution is obtained, about 3–5 minutes being required. The reaction mixture is diluted with acetone and the resulting deep yellow solution of 2-(2-hydroxy-1-naphthyl)-1-(4-tolylsulfonyl)ethene-1,2-dicarbonitrile has an absorption maximum of 452 mµ. An aqueous solution of 10% potassium hydroxide is added until a permanent deep blue solution of the corresponding potassium salt is obtained. The absorption maximum of the resulting solution is 532 mµ.

EXAMPLE XXVII

*2-(4-hydroxy-1-naphthyl)-1-(4-tolylsulfonyl)ethene-1,2-dicarbonitrile*

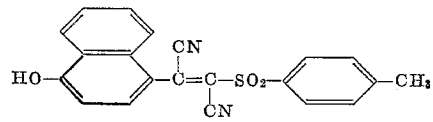

A mixture of 15 parts of α-naphthol and 39 parts of 1,2-dicyano-1,2-bis(p-tolylsulfonyl)ethene in 49 parts of dimethylformamide is stirred at room temperature until a homogeneous deep orange solution is obtained, about five minutes being required. The resulting solution is diluted with acetone and the absorption maximum of the resulting yellow solution of 2-(4-hydroxy-1-naphthyl)-1-(4-tolylsulfonyl)ethene1,2-dicarbonitrile is 460 mµ. Addition of a small amount of aqueous sodium acetate to the acetone solution results in a deep blue solution of the corresponding sodium salt which has an absorption maximum at 532 mµ.

EXAMPLE XXVIII

*2-(4-dimethylaminophenyl)-1-(polyethylenesulfonyl)-ethene-1,2-dicarbonitrile*

(a)

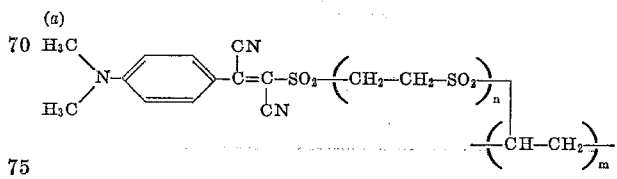

(b) 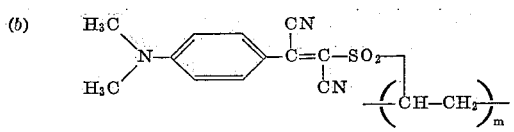

A film of polyethylene 0.0015 inch thick and weighing 45 parts is wrapped in aluminum foil one mil thick and irradiated at −78° C. with 2 mev. electrons to a dosage of 1.25 M rads. The irradiated film is placed in a pressure vessel chilled to −78° C. and containing 200 parts of water and 4000 parts of sulfur dioxide. The vessel is purged three times with ethylene gas and then 4000 parts of ethylene is distilled into the vessel. It is sealed and agitated for 30 minutes at −15 to −2° C. The resulting graft copolymer film shows a weight gain of about 130% and contains ethylene/sulfur dioxide polysulfone grafted onto polyethylene. This film is then agitated for about one hour at room temperature in about 100 times its weight of 10% aqueous sodium hydroxide, then is rinsed with water and dried. Weight loss is about 16%. This treatment hydrolyzes the outer layer of the film to regenerated polyethylene. Under this layer some of the grafts are partially hydrolyzed and some grafts are completely hydrolyzed, in each case the residue being left as a sodium sulfinate end group. A piece of this film is added to a stirred solution of 15 parts of dichlorofumaronitrile and 12 parts of N,N-dimethylaniline in 188 parts of dimethylformamide and the stirring is continued for ten minutes. The film is then removed from the solution, washed with water and dried. It is dyed a brilliant magenta color due to the formation within the film of 2 - (4-dimethylaminophenyl) - 1 - (polyethylenesulfonyl)-ethene-1,2-dicarbonitrile structures of the type indicated at (a) and (b) above.

The use of the products of this invention as dyes is illustrated as follows.

A dye bath is prepared using 5,000 parts of water containing one part of a sulfonated lignin dispersant and two parts of glacial acetic acid. A solution of one part of the dye in 100 parts of acetone is added with stirring. Swatches of cellulose acetate, nylon, silk, wool, polyethylene terephthalate, and polyacrylonitrile fabrics weighing five parts each are added and the dye bath is heated to 80–90° C. for a few minutes. The fabrics are rinsed with water and dried. The fabrics are dyed as listed in the appended Table I, the shade of color varying with the composition of the fabric.

TABLE I

Dyeings with Dyes of Formula Q—C(CN)=C(CN)—SO$_2$—R

| Dye from example | Q | R | Color of dyed fabric ||||||
|---|---|---|---|---|---|---|---|---|
| | | | Cellulose acetate | Nylon | Silk | Wool | Polyethylene terephahalate | Polyacrylonitrile |
| II | (H$_3$C)$_2$N—C$_6$H$_4$— | —C$_6$H$_4$—CH$_3$ | Red | Red | Red | Yellow | Red | Red. |
| III | (H$_3$C)$_2$N—C$_6$H$_4$— | —CH$_3$ | Red | Red | Red | Brown | Red | Red. |
| IV | (H$_3$C)$_2$N—C$_6$H$_4$— | —C$_4$H$_9$(n) | Red | Red | Red | Reddish brown. | Red | Red. |
| V | (H$_3$C)$_2$N—C$_6$H$_4$— | —CH$_2$—C$_6$H$_5$ | Red | Red | Red | Orange | Red | Red. |
| VIII | (H)(H$_3$C)N—C$_6$H$_4$— | —C$_6$H$_4$—CH$_3$ | Red | Red | Red | Yelow | Red | Red. |
| X | (H$_3$C)(NC-CH$_2$-CH$_2$)N—C$_6$H$_4$— | —C$_6$H$_4$—CH$_3$ | Red | Red | Red | Yellow | Orange | Orange |
| XI | (H$_3$C)$_2$N—C$_6$H$_4$— | —CH$_2$—CH$_3$ | Red | Red | Red | Orange | Red | Red. |
| XVII | (H$_3$C)$_2$N—C$_6$H$_4$— | —C$_6$H$_4$—NO$_2$ | Lavender | Lavender | Lavender | Yellow | Lavender | Lavender. |
| XXIV | C$_6$H$_5$—N(O=C—CH—)C(CH$_3$)=N— | —C$_6$H$_4$—CH$_3$ | Reddish brown. | Reddish brown. | Reddish brown. | Reddish brown. | Yellow | |

Other dyes of this invention are prepared as shown in Table II. The indicated compound QH and the sodium or potassium salt of the indicated sulfinic acid are reacted with dichlorofumaronitrile using the procedure of Example III to obtain the indicated dicyanosulfonylvinyl dye.

TABLE II

| Compound QH | Sulfinic Acid (Used as Sodium or Potassium Salt) | Dicyanosulfonylvinyl Dye Obtained by Reaction with Dichlorofumaronitrile |
|---|---|---|
| benzoylacetanilide | β-naphthylsulfinic acid | 2-[(benzoyl)(N-phenylcarbamoyl)methyl]-1-(β-naphthylsulfonyl)ethene-1,2-dicarbonitrile. |
| malononitrile | p-bromphenylsulfinic acid | 1-(p-bromophenylsulfonyl)-2-dicyanomethylethene-1,2-dicarbonitrile. |
| furylacrolein phenylhydrazone | p-fluorophenylsulfinic acid | 1-(p-fluorophenylsulfonyl)-2-(5-[3-phenylhydrazonopropenyl]-2-furyl)ethene-1,2-dicarbonitrile. |
| pyrrole-2-aldehyde dimethylhydrazone | p-iodophenylsulfinic acid | 2-(5-[dimethylhydrazonomethyl]-2-pyrryl)-1-(p-iodophenylsulfonyl)ethene-1,2-dicarbonitrile. |
| sodium salt of 1-naphthol-2-sulfonic acid | octadecylsulfinic acid | 2-(4-hydroxy-3-sodiosulfonyl-1-naphthyl)-1-octadecylsulfonylethene-1,2-dicarbonitrile. |
| 2,6-dimethylphenol | 2-dibenzofurylsulfinic acid | 1-(2-dibenzofurylsulfonyl)-2-(3,5-dimethyl-4-hydroxyphenyl)ethene-1,2-dicarbonitrile. |
| 2,6-dimethylaniline | β-cyanoethylsulfinic acid | 2-(4-amino-3,5-dimethylphenyl)-1-(β-cyanoethylsulfonyl)ethene-1,2-dicarbonitrile. |
| anisole | β-chloroethylsulfinic acid | 1-(β-chloroethylsulfonyl)-2-(p-methoxyphenyl)ethene-1,2-dicarbonitrile. |
| benzaldehyde phenylhydrazone | β-hydroxyethylsulfinic acid | 2-(p-benzylidenehydrazino-phenyl)-1-(β-hydroxyethylsulfonyl)ethene-1,2-dicarbonitrile. |
| β-(N-ethylanilino)ethyltrimethylammonium chloride | β-methoxyethylsulfinic acid | β-[N-ethyl-N-(p-[1,2-dicyano-2-(β-methoxyethylsulfonyl)vinyl]phenyl)amino]ethyltrimethylammonium chloride. |
| ethyl ester of benzoylacetic acid | β-(β-hydroxyethylsulfonyl)ethylsulfinic acid | 2-(1-benzoyl-1-ethoxycarbonylmethyl)-1-[β-(β-hydroxyethylsulfonyl)ethyl]sulfonyl]ethene-1,2-dicarbonitrile. |
| N,N-diethyl-α-naphthylamine | o-carboxyphenylsulfinic acid | 1-(o-carboxyphenylsulfonyl)-2-(4-N,N-diethylamino-1-naphthyl)ethene-1,2-dicarbonitrile. |
| N-(β-benzoyloxyethyl)-N-ethylaniline | p-methoxycarbonylphenylsulfinic acid | 2-(p-N-[β-benzoyloxyethyl]-N-ethylaminophenyl)-1-(p-methoxycarbonylphenylsulfonyl)ethene-1,2-dicarbonitrile. |
| 1-acetyl-2-methyl-2-phenylhydrazine | 5-chloro-2-cyano-3-methylphenylsulfinic acid | 2-(p-[2-acetyl-1-methylhydrazino]phenyl)-1-(5-chloro-2-cyano-3-methylphenylsulfonyl)ethene-1,2-dicarbonitrile. |
| N-allyl-N-methylaniline | β-cyano-1-naphthylsulfinic acid | 2-(p-N-allyl-N-methylaminophenyl)-1-(8-cyano-1-naphthylsulfonyl)ethene-1,2-dicarbonitrile. |
| N-cyclohexyl-N-methylaniline | ethoxycarbonylmethylsulfinic acid | 2-(p-N-cyclohexyl-N-methylaminophenyl)-1-ethoxycarbonylmethylsulfonylethene-1,2-dicarbonitrile. |
| N-methyl-N-propargylaniline | p-acetylaminophenylsulfinic acid | 1-(p-acetylaminophenylsulfonyl)-2-(p-[N-methyl-N-propargylamino]phenyl)ethene-1,2-dicarbonitrile. |
| N,N-di(β-ethoxyethyl)aniline | p-phenylsulfonylphenylsulfinic acid | 2-(p-N,N-di(β-ethoxyethyl)aminophenyl)-1-(p-phenylsulfonylphenylsulfonyl)ethene-1,2-dicarbonitrile. |
| α-thenaldehyde phenylhydrazone | β-phenoxyethylsulfinic acid | 1-(β-phenoxyethylsulfonyl)-2-(5-phenylhydrazonomethyl-2-thienyl)ethene-1,2-dicarbonitrile. |
| o-chlorophenol | trichloromethylsulfinic acid | 2-(3-chloro-4-hydroxyphenyl)-2-trichloromethylsulfonylethene-1,2-dicarbonitrile. |
| ethyl salicylate | 1,7,7-trimethylbicyclo[2,2,1]heptan-2-ylsulfinic acid | 2-(3-ethoxycarbonyl-4-hydroxyphenyl)-1-(1,7,7-trimethylbicyclo-[2.2.1]heptan-2-ylsulfonyl)-ethene-1,2-dicarbonitrile. |
| N,N-dimethyl-1-anthrylamine | 5,6,7,8-tetrahydro-1-naphthylsulfinic acid | 2-(N,N-dimethyl-4-amino-1-anthryl)-1-(5,6,7,8-tetrahydro-1-naphthylsulfonyl)ethene-1,2-dicarbonitrile. |
| cyanothioacetamide | 4-bromo-3-formylphenylsulfinic acid | 1-(4-bromo-3-formylphenylsulfonyl)-2-cyanothiocarbamoylmethylethene-1,2-dicarbonitrile. |
| ethylsulfonylacetonitrile | p-dimethylaminophenylsulfinic acid | 2-(1-cyano-1-ethylsulfonylmethyl)-1-(p-dimethylaminophenylsulfonyl)ethene-1,2-dicarbonitrile. |
| ethyl ester of nitroacetic acid | perfluoroisopropylsulfonic acid | 2-(1-ethoxycarbonyl-1-nitromethyl)-1-perfluoroisopropylsulfonylethene-1,2-dicarbonitrile. |
| N-methylpyrrole-2-aldehyde dimethylhydrazone | β-ethylsulfonylethylsulfinic acid | 2-(5-[dimethylhydrazonomethyl]-N-methyl-2-pyrryl)-1-(β-ethylsulfonylethylsulfonyl)ethene-1,2-dicarbonitrile. |
| N,N-dimethylaniline | β-benzyloxyethylsulfinic acid | 1-(β-benzyloxyethylsulfonyl)-2-(4-dimethylaminophenyl)ethene-1,2-dicarbonitrile. |
| N,N-dimethylaniline | p-methylsulfonylphenylsulfinic acid | 2-(4-dimethylaminophenyl)-1-(p-methylsulfonylphenylsulfonyl)ethene-1,2-dicarbonitrile. |
| N,N-dimethylaniline | p-benzylsulfonylphenylsulfinic acid | 1-(p-benzylsulfonylphenylsulfonyl)-2-(4-dimethylaminophenyl)ethene-1,2-dicarbonitrile. |
| N,N-dimethylaniline | o-aminophenylsulfinic acid | 1-(o-aminophenylsulfonyl)-2-(4-dimethylaminophenyl)ethene-1,2-dicarbonitrile. |
| N,N-dimethylaniline | p-diphenylaminophenylsulfinic acid | 2-(4-dimethylaminophenyl)-1-(4-diphenylaminophenylsulfonyl)ethene-1,2-dicarbonitrile. |
| N,N-dimethylaniline | p-dibenzylaminophenylsulfinic acid | 1-(4-dibenzylaminophenylsulfonyl)-2-(4-dimethylaminophenyl)ethene-1,2-dicarbonitrile. |
| N,N-dimethylaniline | triphenylmethylsulfinic acid | 2-(4-dimethylaminophenyl)-1-(triphenylmethylsulfonyl)ethene-1,2-dicarbonitrile. |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

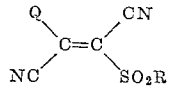

wherein Q is selected from the class consisting of

p-(2-acetyl-1-methylhydrazino)phenyl p-benzylidenehydrazinophenyl,

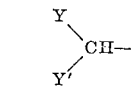

3-methyl-1-phenyl-2-pyrazolin-5-one-4-yl,
1,3,3-trimethylindolin-2-ylidenemethyl,

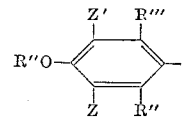

5-(3-phenylhydrazonopropenyl)-2-furyl,
5-dimethylhydrazonomethyl-2-pyrryl,
5-phenylhydrozonomethyl-2-thienyl, and
5-dimethylhydrazonomethyl-N-methyl-2-pyrryl, wherein Ar is carbocyclic arylene of 6 to 14 carbon atoms,
R′ is selected from the class consisting of
 alkyl of up to 20 carbon atoms,
 cycloalkyl of 3 to 20 carbon atoms,
 alkenyl of 2 to 20 carbon atoms,
 alkynyl of 2 to 20 carbon atoms,
 β-alkoxyethyl of up to 20 carbon atoms,
 β-benzoyloxyethyl, β-cyanoethyl, and
β-trialkylammoniumethyl of up to 20 carbon atoms,
R'' is up to 20 carbon atoms and is selected from the class consisting of hydrogen, alkyl and carbocyclic aryl,
R''' is of up to 20 carbon atoms and is selected from the class consisting of hydrogen and alkyl,
Y and Y' are selected from the class consisting of
—CN,
—COOR'',
—COR'',
—CONR''$_2$,
—CSNR''$_2$,
—SO$_2$R'', and
—NO$_2$
Z is selected from the class consisting of
hydrogen,
alkyl of up to 20 carbon atoms,
halogen,
—SO$_3$Na, and
Y,
Z' is selected from the class consisting of Z with the proviso that Z' and R''' taken together form a carbocyclic aryl ring of 6 carbon atoms; and
R is of up to 20 carbon atoms and is selected from the group consisting of hydrocarbyl and substituted hydrocarbyl wherein the hydrocarbyl is selected from the class consisting of
alkyl,
alkenyl,
alkynyl,
cycloalkyl,
carbocyclic aryl,
alkaryl, and
aralkyl
and wherein the substituents on the hydrocarbyl groups are selected from the class consisting of
amino,
dilower alkylamino,
diphenylamino,
dibenzylamino,
hydroxy,
carbamoyl,
cyano,
halo,
nitro,
4-tolylsulfonato,
lower alkoxy,
benzyloxy,
carbocyclic aryloxy,
lower alkoxycarbonyl,
lower alkyl sulfonyl,
benzylsulfonyl,
arylsulfonyl,
carboxy, and
formyl.

2. 2-(4-dimethylaminophenyl) - 1-(4 - tolylsulfonyl)-ethene-1,2-dicarbonitrile.

3. 2-(4-dimethylaminophenyl)-1 - n - butyl - sulfonyl-ethene-1,2-dicarbonitrile.

4. 2-(3-methyl - 1 - phenyl - 2 - pyrazolin - 5 - one-4 - yl) - 1 - (4 - tolylsulfonyl)ethene - 1,2 - dicarbonitrile.

5. Process for the formation of a compound of the formula

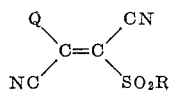

wherein Q and R are defined as in claim 1, which comprises reacting at a temperature of from —40° C. to 150° C. a compound of the formula

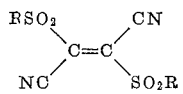

wherein R is defined as in claim 1, with a compound of the formula QH wherein Q is defined as in claim 1, and isolating the resulting product.

6. Process of claim 5 wherein a liquid reaction medium chemically inert to the reactants and products is employed, and the reaction is carried out at a temperature of from —40° C. to 150° C.

7. Process for the formation of a compound of the formula

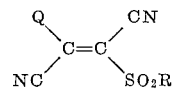

wherein Q and R are defined as in claim 1, which comprises simultaneously reacting at a temperature of from —40° C. to 150° C. a compound of the formula

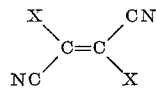

wherein X is halogen with a compound of the formula

wherein M is selected from the class consisting of Group I and Group II of the Periodic Table and R is defined as in claim 1, and a compound of the formula

wherein Q is defined as in claim 12, and isolating the resulting product.

8. Process of claim 7 wherein the reaction is carried out in a reaction medium chemically inert to the reactants and products.

References Cited by the Examiner

UNITED STATES PATENTS 2,533,233  12/1950  Derek et al. _____ 260—319
3,079,421  2/1963   Martin _____ 260—465

FOREIGN PATENTS 351,359  2/1961  Switzerland.

OTHER REFERENCES

Chemical Abstracts, The Naming and Indexing of Chemical Compounds by Chemical Abstracts (Introduction to the 1945 Subject Index), p. 5966 (1953).

Hackh's Chemical Dictionary, 3rd ed., page 18, Philadelphia, Blakiston, 1944.

Webster's Third New International Dictionary, pages 116, 120, 125, and 1108, Springfield, Mass., Merriam 1961.

WALTER A. MODANCE, *Primary Examiner.*

IRVING MARCUS, NICHOLAS S. RIZZO, *Examiners.*